United States Patent Office 3,557,280
Patented Jan. 19, 1971

3,557,280
STABLE SOLUTIONS OF OXYTETRACYCLINE SUITABLE FOR PARENTERAL AND PER-ORAL ADMINISTRATION AND PROCESS OF PREPARATION
Hubert Antonius Weber and Adrianus Pieter Molenaar, Delft, Netherlands, assignors to Koninklijke Nederlandsche Gist-en Spiritusfabriek N.V., Delft, Netherlands, a corporation of the Netherlands
No Drawing. Filed May 26, 1967, Ser. No. 641,483
Claims priority, application Netherlands, May 31, 1966, 6607516
Int. Cl. A61k 27/00
U.S. Cl. 424—80          6 Claims

ABSTRACT OF THE DISCLOSURE

The present invention relates to a clear, stable, aqueous solution of oxytetracycline for medical applications consisting essentially of oxytetracycline and water containing polyvinyl pyrrolidone and a magnesium compound, said aqueous solution having a pH in the range of from 8.0 to 9.5, as well as to the process of preparing the same. The oxytetracycline solutions are utilized in parenteral and peroral administrations, are free from adverse side effects and are stable over long periods of storage.

THE PRIOR ART

Oxytetracycline is known to be poorly soluble in water. The salts of this compound with mineral acids indeed are much better soluble, but at the prevalent pH of such salt solutions (pH=2.0–3.0) these aqueous solutions are not sufficiently stable and thus not very suitable for the preparation of injection fluids with good keeping qualities. Moreover intra-muscular injection of such solutions is very painful and is often attended by the occurrence of considerable necrotic reactions at the situs of the injection. Attempts are made to mask the occurrence of painfulness to some extent by the addition of a local anaesthetic. Nevertheless these solutions are not used very much on account of the above-mentioned serious disadvantages.

It is further known that the solubility of tetracycline derivatives can be increased considerably by the additional presence of calcium or magnesium ions, as a result of which more readily soluble complexes are formed. Yet the solubility of these complexes is still altogether insufficient and it has not been possible to prepare water-soluble complexes with Mg or Ca salts of sufficiently high concentration and stability, and at a physiologically suitable pH, to serve as an injection fluid.

This can largely be achieved indeed if instead of water a substantially organic solvent is used, for instance propylene glycol or a concentrated solution of certain carbon-amides, such as dimethylacetamide or β-hydroxyethyl-lactamide.

Injections with these high concentrations of organic solvent, however, in consequence of their marked hypertonic character also cause painfulness at the situs of the injection, even apart from the rather undesirable fact of large quantities of such unphysiological organic compounds being injected as well.

Attempts have also been made to prepare water-soluble compounds satisfying the requirements of a good injection composition by reacting tetracycline (or its derivatives) with formaldehyde and certain amino compounds, such as dialkylamine, piperazine, morpholine, piperidine, and amino-acids, such as lysine. These so-called Mannich bases are indeed readily soluble in water, but frequently not very stable, so that in the case of prolonged storage the risk exists that the poorly soluble tetracycline (or its derivative) precipitates again. Moreover these compounds, which really must be regarded as new thereapeutic products with properties which are not quite identical with those of their starting products, viz the tetracycline antibiotics as such, must be specially prepared for this purpose.

OBJECTS OF THE INVENTION

An object of the invention is to obtain stable solutions of oxytetracycline which are particularly suitable for parenteral administration of this therapeutically important antibiotic, but can also be made suitable for other therapeutic methods of administration.

Another object of the invention is the obtention of a clear, stable, aqueous solution of oxytetracycline for medical applications consisting essentially of oxytetracycline and water containing polyvinyl pyrrolidone and a magnesium compound, said aqueous solution having a pH in the range of from 8.0 to 9.5.

A further object of the invention is the development of a process for the preparation of a clear, stable, aqueous solution of oxytetracycline which comprises adding oxytetracycline base or a salt thereof to a solution of polyvinyl pyrrolidone dissolved in water containing a suitable amount of a magnesium compound and adjusting the pH of said solution to from 8.0 to 9.5.

These and other objects of the invention will become more apparent as the description thereof proceeds.

DESCRIPTION OF THE INVENTION

The invention relates to the preparation of stable concentrated aqueous solutions of oxytetracycline, which are specially suitable for parenteral administration of the antibiotic. The invention relates in particular to oxytetracycline solutions suitable for intramuscular or intravenous use. The solutions obtained by the application of the invention are extremely stable and are substantially aqueous solutions as to their composition. In addition to the abovementioned purposes they are also suitable, or can be made suitable, for other therapeutic methods of administration, such as a syrup for peroral administration, e.g. in pediatrics, and a solution or jelly for intramammary administration in veterinary practice, for instance.

Intramuscular injection of therapeutic doses of these solutions does not cause painfulness at the situs of injection, so that addition of a local anaesthetic is superfluous. Moreover, a very high oxytetracycline level in the blood is attained shortly after the injection.

The solutions according to the invention are obtained by suspending or dissolving oxytetracycline, either as a base or as a salt, in water in which a given quantity of polyvinyl pyrrolidone has been dissolved and to which has been added a suitable quantity of a magnesium compound, for example, the chloride or the oxide, and by subsequently adjusting the pH of the liquid to a value between 8.0 and 9.5, preferably between 8.5 and 9.0, with the aid of physiologically harmless inorganic or organic base. Suitable bases for this are, for instance, sodium hydroxide, ammonia, ethanolamine, ethylene diamine, etc.

Dependent on the chosen concentrations of oxytetracycline, polyvinyl pyrrolidone, and magnesium compound, the solutions obtained are perfectly clear. Even dilutions of such solutions with water or serum remain clear, so that these solutions are also eminently suitable for intravenous administration of this antibiotic. It is readily possible, when applying this invention, to prepare solutions of this antibiotic in concentrations of for example, 1.0 to 20%, preferably 2.5 to 15% the concentration range which is particularly suitable for medical application.

Polyvinyl pyrrolidone, which is known to be used, inter alia, as a blood plasma expander and as such is medically acceptable, even when administered in large quantities, is a condensation product with an average molecular weight which may vary between about 5,000 and 1,000,000. High-molecular-weight as well as low-molecular-weight polyvinyl pyrrolidone exhibits the unexpectedly strong solubility-enhancing effect of the invention. In view of the higher viscosity of solutions of the high-molecular product, preference is given to the use of low-molecular polyvinyl pyrrolidone, those with a molecular weight of 5,000 to 60,000. For the solutions according to the invention, use is preferably made of polyvinyl pyrrolidone with an average molecular weight of 10,000 to 12,000 (K-value=17). Solutions of 10 to 15% of this product in water do not increase the viscosity appreciably, a property which must be considered particularly favorable for injection fluids.

On account of the still fairly high molecular weight, polyvinyl pyrrolidone also hardly affects the isotonicity of the injection fluid.

It is possible to prepare solutions according to the invention with 7.5 to 25% of PVP; preferably 10 to 15% of PVP is used.

For the production of solutions according to the invention a given quantity of a magnesium compound, preferably the chloride or the oxide, is essential. The amount of magnesium compound is selected so that essentially all of the magnesium ions are complexed by the oxytetracycline. A small excess of the magnesium compound can be present in the solution. The quantity to be used is in a given ratio to the concentration of oxytetracycline and preferably amounts to about 1 to 1.5 mols of magnesium compound to 1 mol of oxytetracycline. If prolonged stability of the solutions is to be ensured, it is further also favorable when, after small bottles or ampoules have been filled with the solutions according to the invention, the air above the fluid is replaced by an inert gas, preferably by nitrogen.

The stability is also favored by the addition to the solutions of comparatively small quantities of a reducing substance, such as sodium metabisulfite, sodium sulfite, or sodium formaldehyde sulfoxylate. If this material is added, it is preferable to add about the same amount as the magnesium compound.

In contrast to many other injection forms of oxytetracycline, intramuscular injection of a medically justified dose of this antibiotic in the new form for administration causes no appreciable pain reaction or necrosis at the situs of the injection.

Solutions according to the invention can also be made suitable for peroral administration (e.g. in pediatrics) in a very effective way by the addition of taste and color correctives.

Solutions according to the invention can also be made suitable for intramammary administration in veterinary practice by addition of a harmless thickening agent. The polyvinyl pyrrolidone acts, in most cases, as the thickening agent.

The following examples are illustrative of the practice of the invention. They are not to be deemed limitative in any respect and other expedients known to those skilled in the art may be employed.

EXAMPLE I

In 82.5 ml. of distilled, sterile, and pyrogene-free water are dissolved 0.5 g. of sodium formaldehyde sulfoxylate and 15 g. of polyvinyl pyrrolidone (K-value=17). Subsequently 0.5 g. of magnesium oxide is suspended in this solution. Then 5.5 g. of oxytetracycline hydrochloride is added to the suspension thus obtained, and the pH is adjusted to 8.5 to 9.0 with the aid of ethanolamine. A clear solution containing 50 mg. of oxytetracycline per ml. is obtained. This solution is sterilized by filtration through a sterilizing and pyrogene-absorbing asbestos filter and subsequently distributed into suitable injection bottles or ampoules.

EXAMPLE II

In 84 ml. of distilled, sterile, and pyrogene-free water are dissolved 0.5 g. of sodium formaldehyde sulfoxylate and 7.5 g. of polyvinyl pyrrolidone (K-value=25). Subsequently 0.5 g. of magnesium oxide is suspended in this solution. Then 5.5 g. of oxytetracycline hydrochloride is added to the suspension thus obtained, and the pH is adjusted to 8.5 to 9.0 with the aid of 10% ammonia. A clear solution is obtained, which contains 50 mg. of oxytetracycline per ml. This solution is finally sterilized and distributed into bottles or ampoules as described in Example I.

EXAMPLE III

In 83 ml. of distilled, sterile, and pyrogene-free water are dissolved 0.5 g. of sodium formaldehyde sulfoxylate and 15 g. of polyvinyl pyrrolidone (K-value=17). Subsequently 0.83 g. of magnesium oxide is suspended in this solution, after which 9.2 g. of oxytetracycline hydrochloride is added and the pH is adjusted to 8.5 to 9.0 with the aid of ethylene diamine. The solution thus obtained then contains approximately 83 mg. of oxytetracycline per ml. The solution is sterilized and distributed into bottles or ampoules as described in Example I.

EXAMPLE IV

In 80 ml. of distilled, sterile, and pyrogene-free water are successively dissolved 0.5 g. of sodium formaldehyde sulfoxylate, 15 g. of polyvinyl pyrrolidone (K-value=17), 2.5 g. of magnesium chloride containing 6 mols of water, and 5.5 g. of oxytetracycline hydrochloride. Subsequently the pH of this solution is adjusted to 8.5 to 9.0 with the aid of ethanolamine. A clear solution containing 50 mg. of oxytetracycline per ml. is formed. This solution is sterilized and distributed into bottles or ampoules as described in Example I.

EXAMPLE V

In 80 ml. of distilled, sterile, and pyrogene-free water are dissolved 0.5 g. of sodium formaldehyde sulfoxylate, 15 g. of polyvinyl pyrrolidone (K-value=17), and 2.5 g. of magnesium chloride containing 6 mols of water. To this solution is added 5.5 g. of oxytetracycline dihydrate, and the pH is adjusted to 8.5 to 9.0 with the aid of ethanolamine. A clear solution containing 50 mg. of oxytetracycline per ml. is obtained. This solution can finally be sterilized and distributed into bottles or ampoules as described in Example I.

EXAMPLE VI

In 78 ml. of distilled, sterile, and pyrogene-free water are dissolved 0.5 g. of sodium formaldehyde sulfoxylate and 15 g. of polyvinyl pyrrolidone (K-value=17), after which 0.5 g. of magnesium oxide is suspended in this solution. In the suspension thus obtained 5.5 g. of oxytetracycline hydrochloride is subsequently dissolved, and the pH is adjusted to 8.5 to 9.0 with the aid of 10% ammonia. The clear solution thus obtained, which contains 50 mg. of oxytetracycline per ml., is finally sterilized and distributed into bottles or ampoules as described in Example I.

EXAMPLE VII

In 86 ml. distilled, sterile, and pyrogene-free water are dissolved 0.5 g. of sodium formaldehyde sulfoxylate and 10 g. of polyvinyl pyrrolidone (K-value=17). In this solution 0.5 g. of magnesium oxide is subsequently suspended, after which 6.0 g. of oxytetracycline citrate is added. Finally the pH is adjusted to 8.5 to 9.0 with the aid of ethanolamine. A clear solution containing 50 mg. of oxytetracycline per ml. is formed. This solution is sterilized and distributed into bottles or ampoules as described in Example I.

EXAMPLE VIII

In 55 ml. of sterile water the following substances are dissolved successively:

|  | G. |
|---|---|
| Methyl p-hydroxybenzoate | 0.09 |
| Propyl p-hydroxybenzoate | 0.01 |
| Sodium sulfite containing 7 mols of water of crystallization | 0.5 |
| Magnesium sulfate containing 7 mols of water of crystallization | 1.6 |
| Polyvinyl pyrrolidone (K-value=30) | 10 |
| Sodium cyclamate | 1 |
| Crystallized sugar | 40 |
| Oxytetracycline hydrochloride | 2.75 |

Subsequently the pH of the liquid is adjusted to 8.5 to 9.0 with the aid of ammonia, and the volume is supplemented with water to 100 ml., if necessary.

In this way a solution with a good taste is obtained, which contains 25 mg. of oxytetracycline per ml. and is suitable for peroral administration.

EXAMPLE IX

In 40 ml. of sterile water the following substances are dissolved successively:

|  | G. |
|---|---|
| Methyl p-hydroxybenzoate | 0.09 |
| Propyl p-hydroxybenzoate | 0.01 |
| Sodium bisulfite | 0.2 |
| Sodium cyclamate | 1 |
| Polyvinyl pyrrolidone (K-value=17) | 25 |
| Crystallized sugar | 40 |
| Glycerine | 10 |
| Oxytetracycline phosphate | 2.8 |

The liquid is subsequently mixed with 0.25 g. of magnesium oxide, and the pH is adjusted to 8.5 to 9.0 with the aid of 4 N sodium hydroxide solution, after which, if necessary, the volume is brought to 100 ml. with water.

In this way a solution with a good taste is obtained, which contains 25 mg. of oxyeteracyline per ml. and is suitable for peroral administration.

EXAMPLE X

In 73 ml. of distilled, sterile, and pyrogene-free water are dissolved 0.5 g. of sodium formaldehyde sulfoxylate and 15 g. of polyvinyl pyrrolidone (K-value=17). In this solution 1.5 g. of magnesium oxide is then suspended, after which 16.5 g. of oxytetracycline hydrochloride is added. The pH of the liquid is subsequently adjusted to 8.5 to 9.0 with the aid of ethanolamine, as a result of which a clear viscous liquid is obtained, which contains approximately 150 mg. of oxytetracycline per ml. and is suitable, for instance, for intramammary administration with a view to combating mastitis.

The preceding specific embodiments are illustrative of the invention. It is to be understood, however, that other expedients, known to those skilled in the art, can be employed without departing from the spirit of the invention.

We claim:

1. A clear, stable, aqueous solution of oxytetracycline for medical applications consisting essentially of from 1% to 20% by weight of oxytetracycline and water containing polyvinyl pyrrolidone and a magnesium compound, said aqueous solution having a pH in the range of from 8.0 to 9.5 and a concentration of polyvinyl pyrrolidone of from 7.5% to 25%, the amount of said magnesium compound being selected so that essentially all of the magnesium ions are complexed by the oxytetracline.

2. A clear, stable, aqueous solution of oxytetracycline for medical applications consisting essentially of water, from 1.0% to 20% by weight of oxytetracycline, from 7.5% to 25% by weight of polyvinyl pyrrolidone having an average molecular weight in the range of 5,000 to 60,000, and from about 1 to 1.5 mols per mol of oxytetracycline of a magnesium compound, said aqueous solution having a pH in the range of from 8.5 to 9.0.

3. A process for the production of the clear, stable, aqueous solution of oxytetracycline of claim 1 which comprises adding oxytetracycline base or a salt thereof to a solution of from about 7.5% to 25% of polyvinyl pyrrolidone dissolved in water containing a suitable amount of a magnesium compound and adjusting the pH of said solution to from 8.0 to 9.5.

4. The process of claim 3 wherein said polyvinyl pyrrolidone has an average molecular weight of between about 5,000 and 60,000.

5. The process of claim 3 wherein said magnesium compound is selected from the group consisting of water-soluble magnesium salts and magnesium oxide.

6. The clear, stable, aqueous solution of oxytetracycline of claim 2 wherein said oxytetracycline is present in an amount of from 2.5% to 15% and said polyvinyl pyrrolidone is present in an amount of from 10% to 15%.

References Cited

UNITED STATES PATENTS

| 2,980,584 | 4/1961 | Hammer | 424—227 |

FOREIGN PATENTS

| 894,619 | 4/1962 | Great Britain. |
| 205,892 | 2/1957 | Australia. |

STANLEY J. FRIEDMAN, Primary Examiner

U.S. Cl. X.R.

424—154, 157, 227